W. L. SNIDER.
POWER TRANSMISSION DEVICE.
APPLICATION FILED JUNE 28, 1918.
1,299,629.
Patented Apr. 8, 1919.
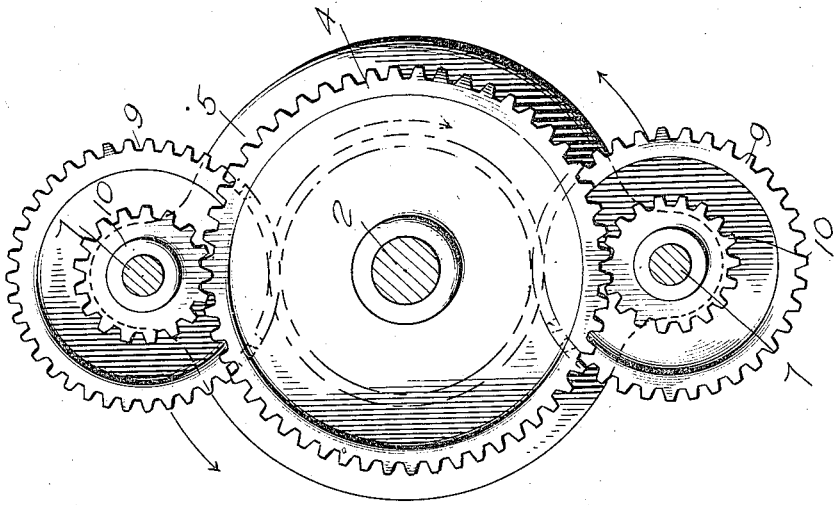
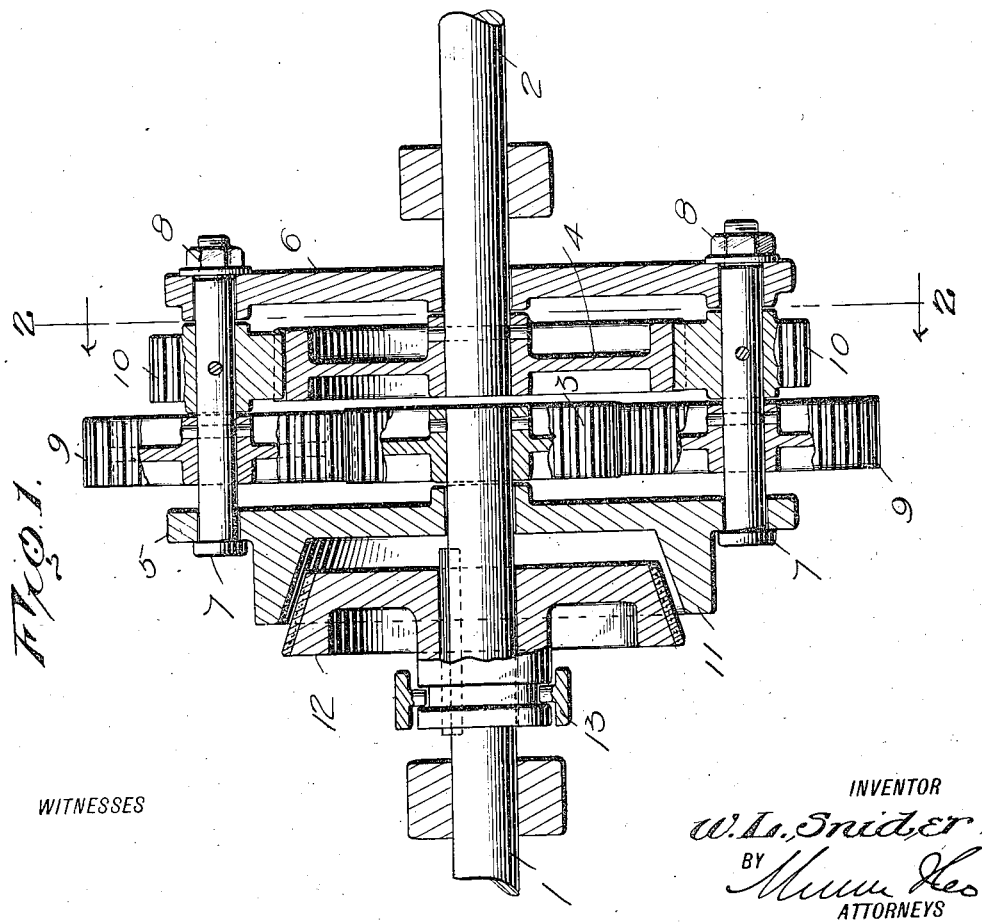
WITNESSES
INVENTOR
W. L. Snider,
BY
ATTORNEYS

UNITED STATES PATENT OFFICE.

WARREN L. SNIDER, OF HOT SPRINGS, ARKANSAS.

POWER-TRANSMISSION DEVICE.

1,299,629.   Specification of Letters Patent.   Patented Apr. 8, 1919.

Application filed June 28, 1918. Serial No. 242,477.

*To all whom it may concern:*

Be it known that I, WARREN L. SNIDER, a citizen of the United States, and a resident of Hot Springs, in the county of Garland and State of Arkansas, have invented certain new and useful Improvements in Power-Transmission Devices, of which the following is a specification.

My invention is an improvement in transmissions, and has for its object to provide a device of the character specified, wherein the driving and the driven shafts may be connected together to rotate at any desired relative speed between zero and a direct drive.

In the drawings:

Figure 1 is a longitudinal vertical section; and

Fig. 2 is a section on the line 2—2 of Fig. 1, looking in the direction of the arrows adjacent to the line.

In the present embodiment of the invention, the driving shaft 1 and the driven shaft 2 are arranged in alinement, and gear wheels 3 and 4 are secured to the adjacent ends of the respective shafts, the gear wheels 4 being of greater diameter than the gear wheel 3. A frame, consisting of spaced plates 5 and 6, is mounted on the two shafts, the plates 5 and 6 being on opposite sides of the gear wheels 3 and 4, and these plates are connected by journal pins 7 which pass through registering openings in the plates and are engaged by nuts 8 adjacent to the plate 6.

A pair of pinions 9 and 10 is secured to each of the journal pins, the pinions 9 meshing with the gear wheel 3 while the pinions 10 mesh with the gear wheels 4, and since the journal pins 7 are at diametrically opposite points the pinions 9 and 10 will engage their respective gear wheels at diametrically opposite points.

One member 11 of a clutch is rigid with the plate 5, and the other member 12 of the clutch is feathered on the driving shaft, and the hub of this member 12 has an annular groove in which engage pins on the arms 13 of a forked lever, by means of which the clutch member 12 may be moved into and out of engagement with the member 11.

In practice, the ratio of the gears is such that the power is first transmitted with a three to one reduction, and from that on a gradual lessening ratio until the transmission is direct. Any speed between nothing and direct may be attained with the improved transmission.

With the parts in the position of Fig. 1, the gear wheel 3 will rotate the pinions 9, and the pinions 10 must rotate at the same speed as the pinions 9. However, the carrying frame 5—6 is free to move, and it will rotate about the shafts, the pinions 10 rollrotate idly over the gear wheel 4 without turning the driven shaft.

Whenever sufficient friction obtains between the clutch elements, the frame 6 is held from rotation. There may be considered as being three positions or adjustments; namely, with the clutch disengaged, with the clutch engaged sufficiently to prevent movement of the carrying frame yet not sufficiently to cause it to move with the driving shaft, and, third, with the clutch fully engaged. In the first position the gear wheel 3 turning with the driving shaft drives the pinions 9 and 10. The gear wheel 4 is held by the load, and the planetary gears 10 will roll about the gear 4, in the opposite direction from that in which the driving shaft is turning, that is, the carrying frame and the pinions 9 and 10 will rotate in reverse direction to the movement of the driving shaft, and the driven shaft will not be moved.

In the second position the clutch is allowed to gradually engage to resist this turning movement of the carrying frame and in proportion to its resistance the power is brought to bear on the driven shaft. As the clutch becomes more engaged there will be a point where the friction will be sufficient to prevent this backward revolving movement of the carrying frame and yet not sufficient to pull the frame forward with the driving shaft. At this point the carrying frame will stand still, and the power transmission is at a three to one reduction.

In the third position, with the clutch fully engaged, the carrying frame is locked to and rotates with the driving shaft, and it is impossible for the planetary gears to roll in any direction. Hence the driving shaft and the driven shaft rotate together and the carrying frame will rotate therewith.

I claim:

A transmission, comprising in combination with the driving and the driven shafts, gear wheels secured to the adjacent ends of the shafts, a carrying frame mounted to rotate on the shafts and carrying journal pins at opposite sides of the shafts, a pair of pinions on each journal pin meshing with the gear wheels of the two shafts, said pinions and said gear wheels being of unequal diameter, and a single friction clutch arranged between the frame and the driving shaft for connecting the said frame and the driving shaft at varying relative speeds.

WARREN L. SNIDER.

Witnesses:
  WM. V. LAWS,
  M. HEID.